340-545 SR

XR RE 28,321

X 20271

Jan. 28, 1975 J. VOSBIKIAN ET AL Re. 28,321

CABINET WITH JAMB SWITCH AND AND ALARM SYSTEM

Original Filed Sept. 25, 1970 2 Sheets-Sheet 1

INVENTORS.
JOSEPH VOSBIKIAN
JAMES T. VOSBIKIAN

BY Kurt L. Spivan
ATTORNEY

Jan. 28, 1975

J. VOSBIKIAN ET AL

Re. 28,321

CABINET WITH JAMB SWITCH AND AND ALARM SYSTEM

Original Filed Sept. 25, 1970

2 Sheets-Sheet 2

INVENTORS.
JOSEPH VOSBIKIAN
JAMES T. VOSBIKIAN

BY Kurt L. Spivak

ATTORNEY.

United States Patent Office

Re. 28,321
Reissued Jan. 28, 1975

28,321
CABINET WITH JAMB SWITCH AND ALARM SYSTEM

Joseph Vosbikian and James T. Vosbikian, Philadelphia, Pa., assignors to Hardware & Industrial Tool Co., Inc., Philadelphia, Pa.

Original No. 3,696,374, dated Oct. 3, 1972, Ser. No. 75,572, Sept. 25, 1970. Application for reissue Mar. 21, 1974, Ser. No. 453,416
Int. Cl. G08b *13/06*
U.S. Cl. 340—274 9 Claims

Matter enclosed in heavy brackets [ ] appears in the original patent but forms no part of this reissue specification; matter printed in italics indicates the additions made by reissue.

ABSTRACT OF THE DISCLOSURE

An alarm system for use in protecting structures such as houses, apartments and the like, having movable access means such as doors and windows. A signal [actuating means] *actuator* is movable between a preset position and a signal actuating position through a set position. The movement of the [actuating means] *actuator* from the preset position to the set position and from the set position to the signal actuating position is timed through the action of a mechanical timer. A trigger [means] is provided for engaging and stopping the movement of the [actuating means] *actuator* in the set position. A [tripping means] *tripper* is connected to the trigger [means] and is associated with a detecting circuit. The opening of [the access means] *a door or window* controls the detecting circuit to actuate the [tripping means] *tripper* whereby the trigger [means] is moved out of engagement with the [actuating means] *actuator* to permit the [actuating means] *actuator* to continue its cycle from the set position to the signal actuating position. A [signaling means,] *signal* such as a bell, is energized when the [actuating means] *actuator* reaches the signal actuating position to energize a signal control circuit. In a preferred embodiment of the invention, a self-contained, portable, low voltage power supply is utilized to drive both the detecting circuit and signal control circuit. In a second [preferred] embodiment of the invention, a high voltage alternating current source is utilized in conjunction with a step-down transformer to energize the detecting circuit and signal control circuit.

BACKGROUND OF THE INVENTION

1. Field of the Invention

This invention relates to alarm systems, and more specifically, to burglar alarm systems for use in protecting structures such as houses, apartments, business establishments and the like.

2. Description of the Prior Art

Complex electronic burglar alarm systems are presently available for installation in homes and in other structures which are to be protected. Such systems are expensive to install and usually require professional personnel to maintain or to repair them when they malfunction. The operative components of many systems are encased in difficult to reach areas, such as within the confines of doors, as exemplified in U.S. Pat. No. 771,749. Because of the inaccessibility of components of existing alarm systems, maintenance and installation work is extremely time consuming and expensive.

The need exists for a low cost alarm system which is reliable in operation, easy to install, and which can be maintained in effective operation at a low cost.

SUMMARY OF THE INVENTION

This invention relates to low cost, extremely reliable, electromechanical alarm systems for protecting structures such as houses, apartments, business establishments and the like. The alarm systems of this invention are designed to sell for approximately one hundred dollars, and can be installed and maintained by a relatively inexperienced mechanic, such as a homeowner with average mechanical capabilities. The majority of components in the alarm systems of this invention can be housed within a cabinet mounted on a wall and are therefore easily accessible for repair.

The alarm systems of this invention have a signaling device, such as a bell, which is energized to signal the opening of an access means of a structure to be protected. An actuating means is connected through a mechanical timing device to move from a preset position to a signal actuation position through a set position. A movable trigger means is provided for engaging and stopping the movement of the actuating means in the set position when all access means, such as doors, windows and the like, of a protected structure are closed. The [rigger] *trigger* means is connected to a tripping means which in turn is controlled by a detecting circuit to trip the trigger means upon the opening of an access means. Tripping the trigger means releases the actuating means to permit said actuating means to move to the signal actuating position, whereat the signaling means is energized to indicate that an access means has been opened. The time required for the actuating means to move from the preset position to the set position allows an individual to exit from the protected structure before the actuating means reaches the set position. Opening of an access means, such as a door, to exit from the structure, trips the trigger means. However, since the actuating means has not reached the set position due to the time delay, the tripping of the trigger means does not release the actuating means from the set position to permit its movement to the signal actuating position. The time delay required for the actuating means to move from the set position to the signal actuating position permits an occupant to enter the protected structure to disengage the alarm before the signaling means is energized. Because there is a time delay from the time an access means is opened until the alarm is energized, alarm de-energizing switches are not required to be mounted on the outside of the protected structure. The requirement for alarm de-energizing switches mounted on the outside of a protected structure, as well as the circuitry connecting such switches to the other alarm components, represents a cost factor which is not present in the alarm systems of the invention. In the alarm systems of this invention, jamb responsive switch means are mounted in door jambs, and in other access areas, such that the opening of any access means actuates an associated switch to control the detecting circuit.

In one preferred embodiment of this invention, the power supply for driving both the detecting circuit and signal control circuit is a low voltage, self contained, DC power supply, and each jamb-responsive switch is mounted in parallel with every other jamb responsive switch and in series with the tripping means. The jamb-responsive switches are closed when an access means is opened to thereby [energized] *energize* the detecting circuit to trip the trigger means and actuate the alarm. The only elements of the alarm system extending outside of a cabinet which houses the majority of the alarm system components, are jamb-responsive switches and the conductors connecting such switches to the tripping mechanism and power supply.

In a second embodiment of this invention, the power source for driving both the detecting circuit and signal controlling circuit is a high voltage, alternating current source which is utilized in connection with a step-down transformer. In this system, the jamb-responsive switches are closed when the access means are closed and are opened to de-energize the detecting circuit when an access means is opened. In this embodiment of the invention, the de-energizing of the detecting circuit trips the trigger means to actuate the alarm. The various [jam] *jamb* responsive switches which are mounted in access means such as door jambs, window jambs, and the like, are mounted in series with each other, and in series with the tripping mechanism.

It is an object of the present invention to provide improved alarm systems of the type set forth.

It is a further object of this invention to provide alarm systems which are low in cost and reliable in operation.

It is a further object of this invention to provide alarm systems in which a time delay exists between the opening of an access means of a protected structure and the actuation of the signaling device of the alarm system.

It is a further object of this invention to provide alarm systems wherein jamb-responsive switches are mounted for actuation by the opening and closing of access means.

It is a further object of this invention to provide an alarm system utilizing a relatively low cost, low voltage, self-contained DC power source for driving a detecting circuit and signal control circuit.

It is a further object of this invention to provide an alarm system utilizing a high voltage, alternating current source in conjunction with a step-down transformer for driving the detecting circuit and signal control circuit.

Other objects and a fuller understanding of the invention will be had by referring to the following description and claims of the preferred embodiments thereof, taken in conjunction with the accompanying drawings wherein like reference characters refer to similar parts throughout the several views and in which:

DESCRIPTION OF THE PREFERRED EMBODIMENTS OF THE INVENTION

For simplicity of discussion, the alarm systems of this invention will be described for use in homes. It is understood, however, that the alarm systems of this invention can be used to protect any other type of structure having access means.

Figure 2:
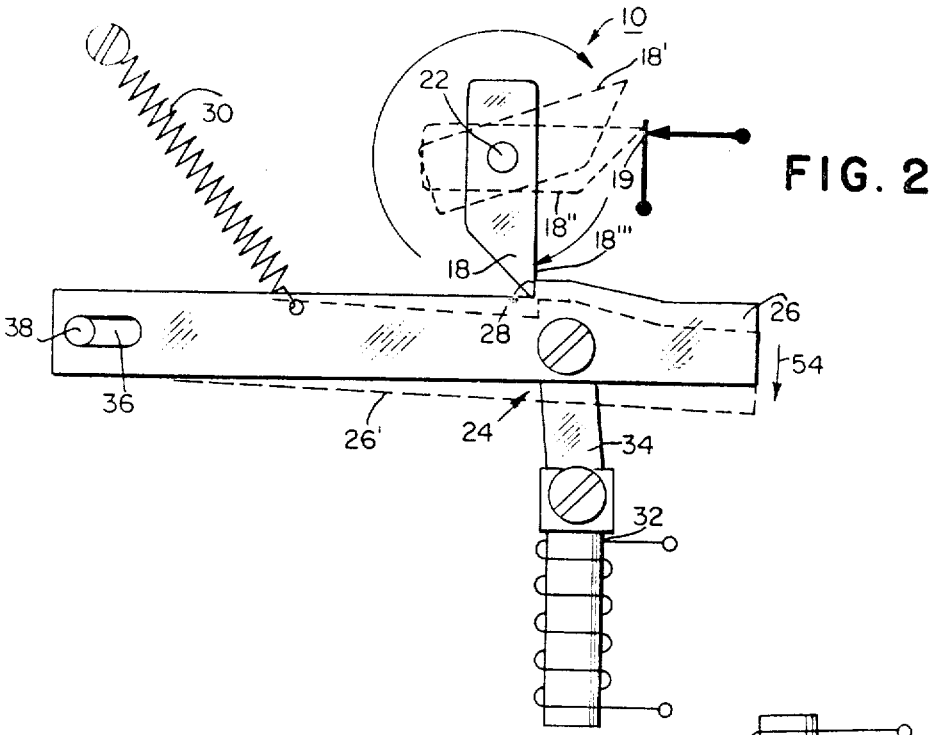
FIG. 2 is a schematic representation showing the components of the first embodiment of this invention in one position.

The construction and operation of a first preferred embodiment of an alarm system of this invention will be described with reference to FIGS. 1–4. The alarm system 10 is housed within a cabinet 12 which can be provided with a lockable door (not shown). The cabinet 12 mounts on a wall or in any other suitable location. The cabinet 12 is shown in section in FIG. 1 to expose details of construction of the alarm system. An alarm conditioning switch 14 (FIG. 1) is provided for conditioning a signal control circuit 16 (FIG. 4) in such a manner that when an actuating arm 18 is in the alarm actuating position 18'' (FIGS. 2 and 4) to close an actuating switch 19, a signaling device 20 which in the preferred embodiment of the invention is a bell, will be actuated. The actuating arm 18 is rotatably movable between a preset position 18' and the alarm actuating position 18'' through a set position 18''' (FIG. 2). Prior to conditioning the alarm for operation, the actuating arm 18 is normally disposed in the alarm actuating position 18''. Therefore, before setting the alarm, the system can be checked out by merely flipping the alarm conditioning switch 14 to its "on" position which will complete the alarm control circuit to actuate the signaling device 20 to assure that the system is operative. Once the system is checked out, the actuating arm 18 can be rotated in a clockwise direction (FIG. 2) out of the alarm actuating position 18'', through the set position 18''' to the [present] *preset* position 18'.

The actuating arm 18 is connected to a conventional mechanical timer (not shown) through a shaft mount 22 in well known manner. The mechanical timer can be similar to those commonly utilized on stoves and other appliances. One timer suitable for use in conjunction with the alarms of this invention is manufactured by M. H. Rhodes & Co. of Hartford, Conn. [, as] . *As* hereinafter more fully set forth, the mechanical timer controls the time duration for rotative movement of the actuating arm 18 from the preset position 18' to the set position 18''', and from the set position 18''' to the alarm actuating position 18''.

A triggering assembly 24 (FIGS. 1 and 2) is provided for triggering the operation of the alarm system in response to the opening of a door, or other protected access means of a house. The triggering assembly 24 comprises a trigger bar 26 having an upstanding stop surface 28 for engaging the actuating arm 18 and stopping the latter's rotative movement in set position 18'''. (FIG 2). The trigger bar 26 is connected to a tripping means in the form of a tensioned coil spring 30 and a solenoid 32. The solenoid 32 connects to the trigger bar 26 through a connecting link 34 which pivotally connects to the solenoid and trigger bar. The trigger bar 26 is mounted for substantially longitudinal movement at one end through the interaction of an elongated slot 36 and a pin 38, and is supported at the other end through a channel member 40. (FIG. 1) A power supply, in the form of a self contained, low voltage, heavy duty battery 42 (FIG. 1) is provided for driving a detecting circuit 44 and the signal control circuit 16 (FIG. 4).

Figure 4:
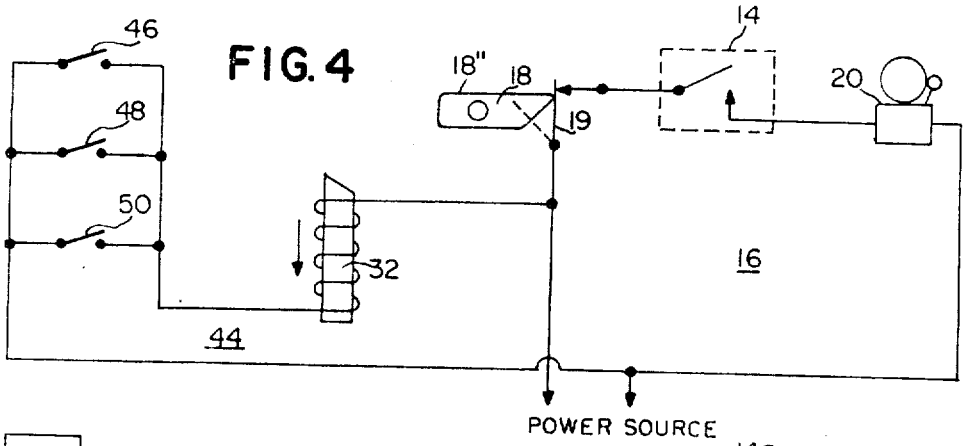
FIG. 4 is a schematic representation of the circuitry associated with the first embodiment of this invention.

Referring now to FIG. 4, the detecting circuit 44 contains a plurality of contactors, or jamb-responsive switches, three of which are shown at 46, 48 and 50.

It is understood that the number of jamb-responsive switches which are provided will depend on the number of access means which are to be wired into and protected by the alarm system. The jamb-responsive switches are wired in parallel with respect to each other, and are mounted in series with the solenoid 32. The jamb-responsive switches are mounted in association with access means, such as doors, windows, and the like, such that said switches are in an open, or circuit breaking position, when the access means are closed. The opening of an access means will close its associated switch for completing the detecting circuit 44 to energize the solenoid 32. Closing an access means which has previously been opened will de-energize the detecting circuit, and thereby de-energize the solenoid 32 (assuming all other access means are closed). The signal control circuit 16 contains the alarm conditioning switch 14 therein. When the switch 14 is in the "off," or open position, the signal control circuit 16 will remain de-energized, regardless of the condition of the detecting circuit 44. When the alarm conditioning switch 14 is in the "on," or closed position, the signal control circuit 16 will remain de-energized until the actuating switch 19 is closed by the movement of the actuating arm 18 into the alarm actuating position 18''.

The alarm system 10 is operated in a manner which will now be described. Prior to setting the alarm system, the actuating arm 18 is usually in the alarm actuating position 18''; however, it is not critical to the invention that the actuating arm be in this position. With the actuating arm 18 in the alarm actuating position 18'', the alarm conditioning switch 14 is flipped to the "on," or, closed position to test out the signal control circuit to assure that it is operating properly. Referring to FIG. 4, it is obvious that when the alarm conditioning switch 14 is in the closed position and the actuating arm 18 is in the alarm actuating position 18'', the signal control circuit 16 is closed and energized to operate the signaling device 20. Once the alarm system has been checked out the actuating arm 18 is turned in a clockwise direction as indicated in FIG. 2, to the preset position 18'. The time required for the actuating arm to move from this preset position 18' to the set position 18''' under impetus of the mechanical timer (not shown) is sufficient to permit occupants of the house to exit through a door and close the door prior to the actuating arm 18 reaching the set position 18'''. This is critical to the operation of the device, since the opening of a door will close an associated jamb-responsive switch (e.g., 46, 48 or 50) to energize the solenoid 32 to move the trigger bar in a downward direction as indicated by the arrow 54 to the position 26' (FIG. 2) as indicated in phantom lines. If the actuating arm 18 rotates to the set position 18''' before the door is closed, the rotation of the actuating arm will not be stopped by the trigger bar stop surface 28 and will continue on to the alarm actuating position 18'' to energize the circuit 16 and thus sound the signal device 20. Once the occupants in the house leave and shut the door, the solenoid 32 will de-energize, and the trigger bar 26 will return to the position shown in solid lines in FIG. 2. In this position, the stop surface 28 of the trigger bar will engage the actuating arm and stop said arm in the set position 18'''.

Figure 1:
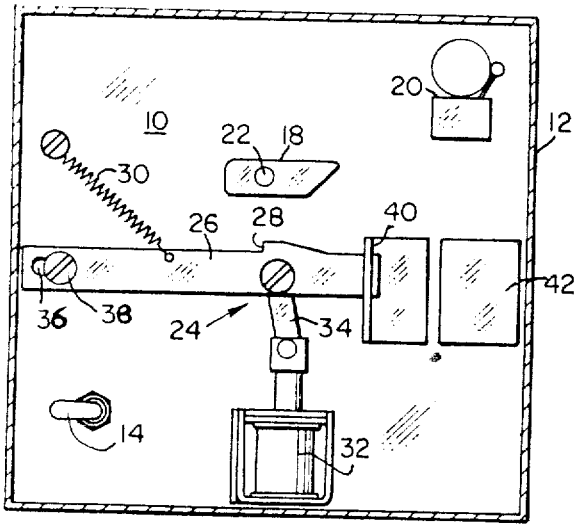
FIG. 1 is a schematic front elevation view of a first embodiment of this invention.
Figure 3:
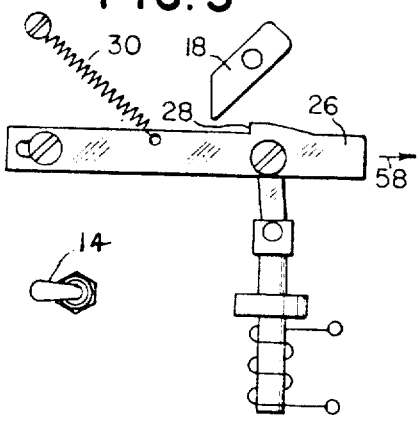
FIG. 3 is a schematic representation of the first embodiment of this invention showing some of the components thereof in a different position.

Prior to the engagement of the actuating arm with the stop surface 28 of trigger bar 26, the trigger bar will be in the position illustrated in FIG. 3. Engagement of the actuating arm with the stop surface 28, will move the trigger bar 26 in the longitudinal direction indicated by arrow 58 to the position shown in FIG. 2.

The channel in channel member 40 through which the trigger bar 26 extends is dimensioned to permit and guide such longitudinal movement. In this position, the coil spring 30 is tensioned to bias the trigger bar 26 back to the position shown in FIG. 3 once the trigger bar is moved downwardly to position 26' (FIG. 2) such that the surface 28 of the trigger bar disengages from the actuating arm 18. The alarm system 10 is conditioned to indicate the opening of a door or other access means when the actuating arm is disposed in the set position 18''', against the stop surface 28 of the trigger bar 26 (FIG. 2). If a person attempts to enter the house by opening a window, door, or other access means having a jamb-responsive switch associated therewith, such switch will be closed to actuate the solenoid 32. Actuation of the solenoid 32 will cause a downward movement of the trigger bar 26 to position 26' shown in phantom line representation in FIG. 2. In this position, the stop surface 28 of the trigger bar rides clear of the actuating arm 18 and the coil spring 30 functions to pull the trigger bar 26 into the position shown in FIG. 3 to thereby positively insure the disengagement of the trigger bar from the actuating arm 18. Once the actuating arm 18 is disengaged from the trigger bar 26, the timed cycle of the actuating arm 18 initiates from the set position 18''' to the alarm actuating position 18''. When the actuating arm reaches the alarm actuating position, the switch 19 (FIG. 4) closes to energize the signal control circuit 16 and thereby energize the bell, or other signal device 20. Means have been incorporated to vary the time operation of the actuating arm 18 by adjusting the location of the preset position 18'. Thus, a longer rotative period or a shorter period may be provided as desired by the operator.

The time delay between the opening of an access means and the energizing of the signal control circuit enables the occupants of the house to enter the house, open the alarm containing cabinet 12 and de-energize the system prior to the energizing of the signal control circuit. The system is de-energized by merely flipping the alarm conditioning switch 14 to the "off," or open position.

If the alarm is conditioned for operation, and an individual opens a door or other access means, there is no way of de-energizing the alarm circuit without getting into the cabinet structure 12, since the complete signal control circuit, including the power supply, is housed within said cabinet structure. The only components which are not enclosed within the cabinet structure are the jamb-responsive switches, e.g. 46, 48 and 50, and their associated connectors.

As herebefore set forth, the provision of a time delay between the opening of an access means to the house, and the actuation of a signal device makes it unnecessary to provide external de-energizing switch means on the outside of the house. The elimination of this requirement makes the alarm system 10 of this invention more economical than those systems requiring such an external de-energizing switch means.

In the alarm system 10, the only time there is an electrical drain on the power supply 42 is when an access means is opened to close one of the jamb-responsive switches, or when the signal control circuit 16 is completed by the closing of actuating switch 19 and alarm conditioning switch 14. Since there is relatively little demand on the power supply supply, the alarm system 10 of this invention is readily adaptable for use with a heavy duty, low voltage direct current power supply, such as a 6 volt heavy duty battery.

It is also within the scope of this invention to provide a detecting circuit conditioning switch (*not shown*) in one of the lines of the detecting circuit 44. Such a switch will have the same function in the detecting circuit, as the alarm conditioning switch 14 has in the signal control circuit 46. Such a switch might be desirable, since it may be common during various times of the year to leave windows and other access mean opened. By providing a detecting circuit conditioning switch, the detecting circuit can be de-energized so that there will not be any drain on the power supply in the event that windows or other access means are left open.

Figure 6:
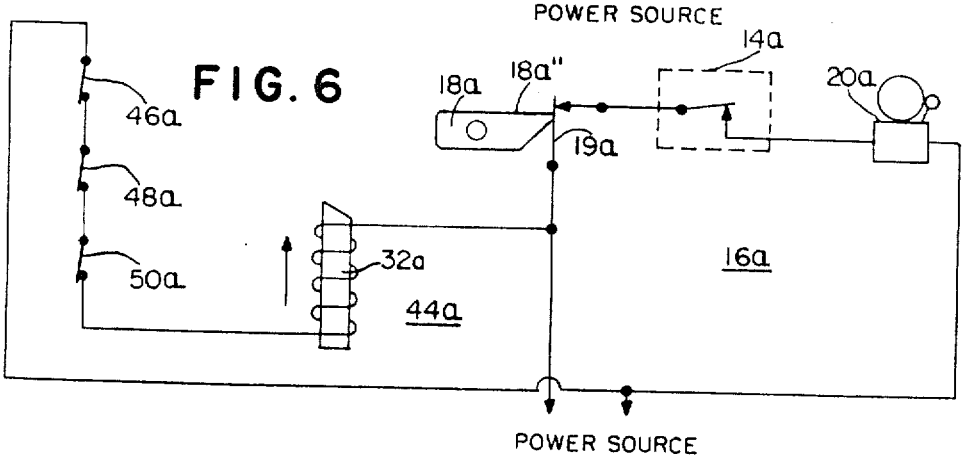
FIG. 6 is a schematic representation of the circuitry for controlling the second embodiment of this invention.
Figure 5:
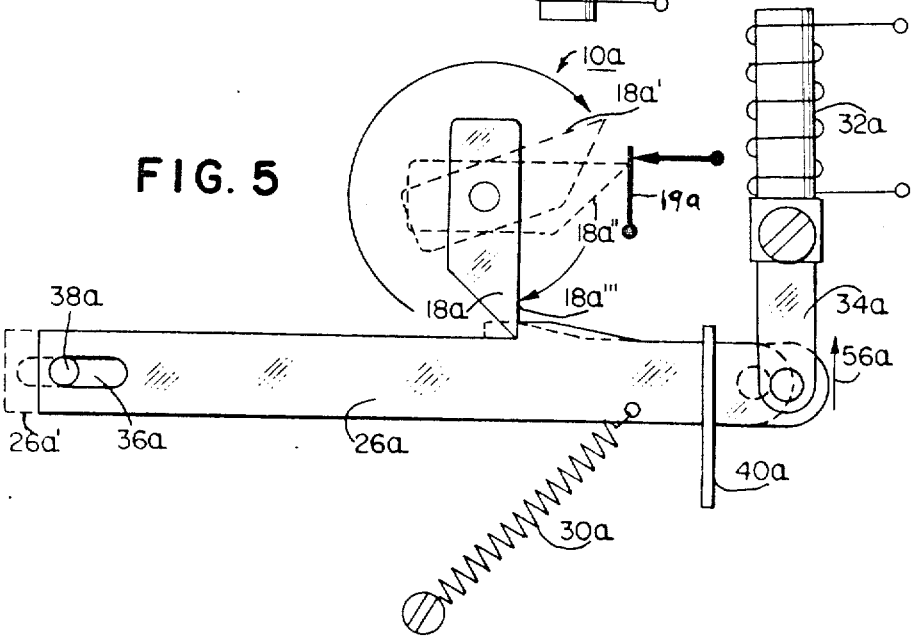
FIG. 5 is a schematic representation of a second embodiment of this invention.

Referring now to FIGS. 5–7, a second embodiment of this invention will now be described. In this embodiment of the invention, components which are similar to components of the first embodiment of this invention will be designated by the same numerals with a suffix a thereafter.

The second embodiment of this invention operates in the same manner as the first embodiment of the invention, except as to those differences in operation and construction which will now be described. In the second embodiment of the invention the alarm system 10a is adapted to be operated with a high voltage power supply, and requires a transformer (not shown) since the solenoid 32a is continually energized when the access means of a house are closed. The alarm system 10a is conditioned for operation when the actuating arm 18a is in the set position 18a''', as shown in FIG. 5. The trigger bar 26a is maintained in engagement with the actuating arm 18a, by the action of the energized solenoid 32a which tends to pull the trigger bar 26a upwardly in the direction of arrow 56a against counteracting force of the tension coil spring 30a. Upward movement of trigger bar 26a is limited by a channel member 40a. Note, that when alarm system 10, described in FIGS. 1–4, is conditioned, the solenoid 32 is not energized, whereas when the alarm system 10a is conditioned, the solenoid 32a is energized.

Referring to FIG. 6, the contactors or jamb-responsive switches 46a, 48a and 50a, which are associated with access means such as doors, windows and the like, are connected in series with respect to each other and also with respect to the solenoid. These switches are closed when associated access means are closed. Therefore, when all access means are closed, there is a continual flow of electrical current through the solenoid. Note, that in the alarm system 10 described in FIGS. 1–4, the switches 46, 48, and 50 are in an open position when all access means are closed, and the solenoid 32 is de-energized.

When the alarm system 10a is conditioned for operation, and an individual opens an access means, the jamb-responsive switch associated with that access means will open to thereby de-energize the solenoid 32a. When the solenoid 32a is de-energized, the coil spring 30a will pull the trigger bar 26a downwardly whereby the stop surface 28a will clear the actuating arm 18, and the coil spring will then pull the trigger bar 26a rearwardly to the position shown at 26a' (FIG. 5).

Since the solenoid 32a is continuously energized when the alarm system 10a is conditioned for operation, a transformer associated with a high voltage source must be utilized. A self contained low voltage DC source would not be suitable for the alarm system 10a, since it would be quickly drained, and therefore have a short useful life. The alarm system 10a, could be adapted for operation off a standard 110 volt line.

We claim:

1. In an alarm system for use in protecting window and door openings in a structure of the type employing jamb-responsive switches, a power supply, an alarm signal device and having no alarm de-energizing switch exterior of the structure, the combination of A. a cabinet including a channel member;

B. a triggering assembly mounted within the cabinet and movable relative to the channel member, 1. said triggering assembly comprising a trigger bar which has a first end and a second end,
   a. said first end being pivotally connected to the said cabinet,
   b. said second end being slidingly restrained by the said channel member,
   c. said trigger bar being formed to provide an upstanding stop surface,
   d. said trigger bar being movable from a first position to a second position;

C. a tripping means assembly associated with the triggering assembly, and including a solenoid, a coil spring and a connecting link, 1. said solenoid being movable from a first position to a second position in response to a function of a said jamb responsive switch,
2. said solenoid pulling the trigger bar about its said pivotal connection to its second [second] position when moved to its second position by function of a jamb operated switch,
3. said spring biasing between a portion of the cabinet and the trigger bar to continuously urge the trigger bar to its said first position;

D. an actuating arm rotatably mounted upon the cabinet through a mechanical timer, 1. said actuating arm being rotatable from a preset position to a set position to an alarm actuating position through a timed cycle of operation,
2. said actuating arm being retained in the said set position by engagement against the said upstanding stop surface when the trigger bar is in its first position,
3. said actuating arm being rotated to its alarm actuating position when the solenoid pulls the trigger bar to its second position to disengage the actuating arm from the upstanding stop surface; and E. an alarm circuit including the power supply, the jamb responsive switches, the solenoid and the alarm signal device, 1. said alarm circuit including a normally open actuating switch,
   a. said actuating switch being closed by the actuating arm when the actuating arm is permitted to rotate to its alarm actuating position when the trigger bar is moved to its second position,
   b. said alarm signal device being powered to emit a warning sound when the actuating switch is closed.

2. The invention of claim 1 wherein the first end of the trigger bar is pivotally connected to the cabinet by means of a cabinet mounted stationary pin interacting with an elongated slot provided in the said first end.

3. The invention of claim 2 wherein the trigger bar has both rotative movement and longitudinal movement relative to the said pin to positively insure disengagement of the trigger bar from the actuating arm when the solenoid functions to pull the trigger bar to its said second position.

*4. In an alarm system for use in protecting window and door openings in a structure of the type employing jamb-responsive switches, a power supply, and an alarm signal device, the combination of*

*(A) a cabinet;*

*(B) a triggering assembly mounted within the cabinet and movable relative to the cabinet,*

*(1) said triggering assembly comprising a trigger bar which has a first end and a second end,*
   *(a) said first end being pivotally connected to the said cabinet,*
   *(b) said trigger bar being formed to provide a stop surface,*
   *(c) said trigger bar being movable from a first position to a second position;*

*(C) a tripping means assembly associated with the triggering assembly, and including a solenoid and a coil spring,*

*(1) said solenoid being movable from an initial position to a final position in response to a function of a said jamb responsive switch,*
*(2) said solenoid pulling the trigger bar about its said pivotal connection to its second position when moved to its final position by function of a jamb operating switch,*
*(3) said spring biasing between a portion of the cabinet and the trigger bar to continuously urge the trigger bar to its said first position;*

*(D) an actuating arm rotatably mounted upon the cabinet through a mechanical timer,*

*(1) said actuating arm being rotatable from a preset position to a set position to an alarm actuating position through a timed cycle of operation,*
*(2) said actuating arm being retained in the said set position by engagement against the said stop surface when the trigger bar is in its first position,*
*(3) said actuating arm being rotated to its alarm actuating position when the solenoid pulls the trigger bar to its second position to disengage the actuating arm from the stop surface; and*

*(E) an alarm circuit including the power supply, the jamb responsive switches, the solenoid and the alarm signal device,*

*(1) said alarm circuit including a normally open actuating switch,*
   *(a) said actuating switch being closed by the actuating arm when the actuating arm is permitted to rotate to its alarm actuating position when the trigger bar is moved to its second position,*
   *(b) said alarm signal device being powered*

*to emit a warning sound when the actuating switch is closed.*

*5. The invention of Claim 4 and a channel member affixed to the cabinet, the said channel member being provided with an open channel and wherein a portion of the trigger bar inserts into the channel.*

*6. The invention of Claim 5 wherein the channel is formed to adequate dimensions to permit movement of the trigger bar from the said first position to the second position.*

*7. The invention of Claim 6 wherein the open channel is configured to restrain the movement of the trigger bar.*

*8. The invention of Claim 7 wherein the movement of the trigger bar is in a longitudinal direction.*

*9. The invention of Claim 7 wherein the movement of the trigger is in a direction which is pivotal about the said pivotally connected end of the trigger bar.*

References Cited

The following references, cited by the Examiner, are of record in the patented file of this patent or the original patent.

UNITED STATES PATENTS

| | | | |
|---|---|---|---|
| 3,787,832 | 1/1974 | Bolinger | 340—274 |
| 3,513,466 | 5/1970 | Isaacs et al. | 340—274 |
| 3,310,775 | 3/1967 | Birth | 340—276 X |
| 3,266,029 | 8/1966 | Callahan | 340—274 |
| 3,200,393 | 8/1965 | Worley | 340—274 |
| 2,346,171 | 4/1944 | Laford | 340—274 |
| 2,250,828 | 7/1941 | Foss | 340—274 |

DONALD J. YUSKO, Primary Examiner

U.S. Cl. X.R.

200—61.76